June 4, 1957 J. W. SCHOLTEN ET AL 2,794,860
SIGNAL RECEIVER
Filed July 31, 1952
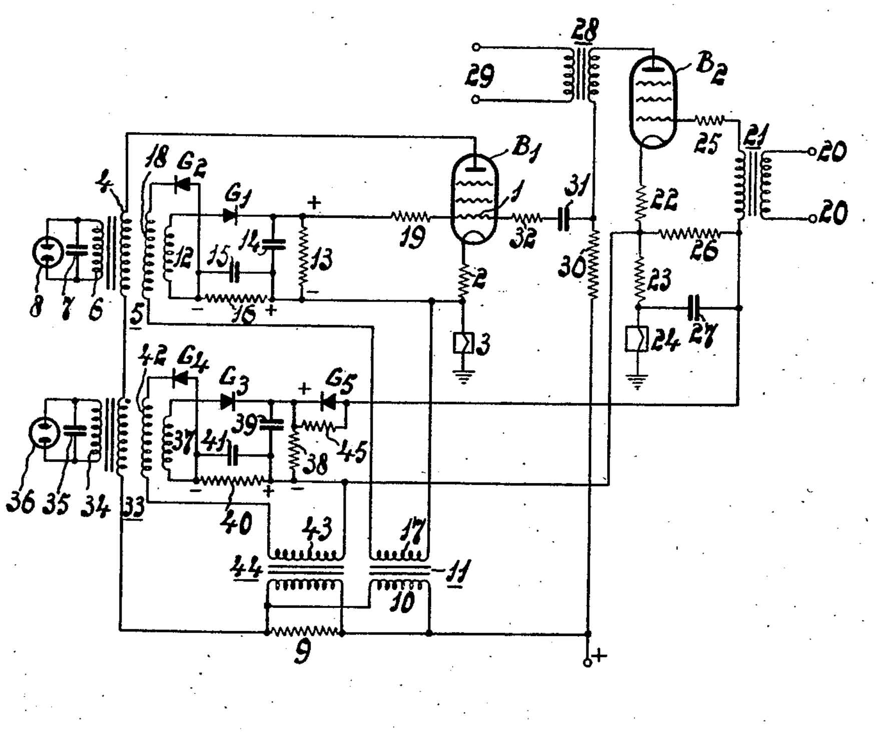
*INVENTORS*
Johannes Ensink
Jacob Willem Scholten
*BY* [signature]
*AGENT*

United States Patent Office 2,794,860
Patented June 4, 1957

2,794,860

SIGNAL RECEIVER

Jacob Willem Scholten and Johannes Ensink, Hilversum, Netherlands, assignors, by mesne assignments, to North American Philips Company, Inc., New York, N. Y., a corporation of Delaware Application July, 31, 1952, Serial No. 301,852

Claims priority, application Netherlands September 10, 1951

3 Claims. (Cl. 179—84)

The present invention relates to a receiver for intelligence signals. More particularly, the invention relates to signal receivers for use in low-frequency or carrier-wave telephony, which are responsive to alternating-current signalling pulses having a frequency within the band of intelligence frequencies. Said signal receivers comprise a discharge tube the output circuit of which includes a relay and the anode circuit of which is coupled to a circuit which is tuned to the frequency of the pulses and has derived from it, by means of a rectifier, a rectified voltage which is fed to a control grid of the tube for varying the operating condition thereof.

The signalling pulses may each be composed of a number of cycles of an oscillation whose frequency is, for example, 2500 cycles per second, in which event the tuned circuit must be tuned to 2500 cycles per second. Upon receipt of a pulse, this circuit exhibits a high alternating voltage which, upon rectification, supplies a direct voltage by means of which the anode current of the tube is increased or decreased in a manner such that the relay included in the output circuit is energized or deenergized.

In signal receivers of the type indicated, incorrect signalling may ensue due to the occurrence in the intelligence of oscillations having the frequency of the pulses.

The present invention relates to a signal receiver in which this difficulty is obviated in an efficient manner. According to the invention, a resistor included in the aforesaid anode circuit has derived from it, by means of a second rectifier, a rectified voltage which is supplied to the circuit of the first rectifier in a sense opposite to that of the aforesaid rectified voltage. The second rectifier is at the same time supplied with a voltage which is obtained from the tuned circuit and is in phase-opposition to the voltage derived from the resistor at the frequency of the pulses.

The invention is not restricted to signal receivers for receiving signalling pulses having only one frequency, but may be extended to signal receivers for receiving signalling pulses having different frequencies, for example 2500 cycles per second and 3000 cycles per second.

In order that the invention may be clearly understood and readily carried into effect, one embodiment thereof will now be described with reference to the accompanying drawing, wherein the single figure is a schematic diagram of the receiver of the present invention.

The figure shows a signal receiver for amplifying speech and for receiving two groups of signalling pulses of, for example, 2500 cycles per second and 3000 cycles per second, all details not required for an understanding of the invention being omitted for the sake of simplicity.

For the sake of clarity, the behavior of the signal receiver on receipt of signalling pulses of only one frequency, viz. 2500 cycles per second, will be explained first.

The received signalling pulses (as well as speech signals) are fed to the control grid 1 of a discharge tube $B_1$. The cathode of this tube is connected to ground via the series combination of a resistor 2 and a relay winding 3.

The anode circuit of $B_1$ includes a primary winding 4 of a transformer 5. A secondary winding 6 of the transformer 5 is tuned to the frequency of 2500 cycles per second with the aid of a capacitor 7. A neon-lamp 8 is connected in parallel with the capacitor 7. The anode circuit comprises in addition a resistor 9 across which the primary winding 10 of a transformer 11 is connected.

Another winding 12 of the transformer 5 is connected to a first rectifier circuit which includes a rectifier $G_1$ and the parallel combination of a resistor 13 and a capacitor 14 and which also includes the parallel combination of a capacitor 15 and a resistor 16. The latter combination is also included in a second rectifier circuit connected to the secondary winding 17 of transformer 11, the second rectifier circuit being completed by a winding 18 of the transformer 5 and a second rectifier $G_2$.

If a signalling pulse having a frequency of 2500 cycles per second is applied to the control grid 1 of tube $B_1$, a high alternating voltage will be set up across the circuit 6, 7 which is tuned to 2500 cycles per second and this will result in a high alternating voltage being set up across the winding 12. The last-mentioned voltage is rectified by the rectifier $G_1$, the resistor 13 then exhibiting a direct voltage, of the polarity shown, which is fed to the control grid 1 of tube $B_1$ via a series resistor 19. This results in the anode current of the tube $B_1$ being increased and the relay 3 being energized.

Energization of the relay 3 by means of speech signals is avoided by the provision of the second rectifier circuit. The second rectifier circuit is supplied with the voltage set up across the resistor 9, which voltage is rectified by the rectifier $G_2$ so that a voltage of the polarity indicated is set up across the resistor 16. This voltage is also active in the circuit of the rectifier $G_1$ and has a cut-off effect.

If signalling pulses alone were present, this cut-off voltage would be undesirable, and it is for this reason that the winding 18 is connected in series with the rectifier $G_2$, the sense being such that an alternating voltage of 2500 cycles per second is set up across the winding 18 in phase-opposition to the voltage of 2500 cycles per second set up across the winding 17.

At the commencement of a signalling pulse the voltage across the transformer winding 17 increases more rapidly than the voltage across the circuit 6, 7, so that the cut-off voltage across the resistor 16, which voltage is initially not entirely compensated, tends to reduce the rise of the anode current of the tube $B_1$.

To obviate this tendency, the sense of the winding 17 is chosen to be such that upon an increase in current of the tube $B_1$ a voltage is induced in the winding 17 and cuts off the rectifier $G_2$.

The received signals are fed from input terminals 20 via transformer 21 to the control grid circuit of a tube $B_2$. The cathode of tube $B_2$ is connected to ground via the series combination of a resistor 22, a resistor 23 and the winding 24 of a second relay.

The control grid circuit includes, in addition to the secondary winding of the transformer 21, resistors 25 and 26. A capacitor 27 is connected in parallel with the resistor 26 and the resistor 23.

The anode circuit of $B_2$ includes the primary winding of a transformer 28, which has a secondary winding connected to terminals 29 for the speech channel.

In addition, the anode circuit of tube $B_2$ includes a resistor 30. The voltage set up across the resistor is fed to the control grid 1 of tube $B_1$ via a blocking capacitor 31 and a resistor 32.

Apart from the circuit elements already described, the anode circuit of tube $B_1$ includes a transformer 33 one secondary winding 34 of which constitutes with a parallel capacitor 35 a second tuned circuit, which in the present instance is tuned to the frequency of the second group of signalling pulses, in this example, 3,000 cycles per second. A neon-lamp 36 is connected in parallel with the circuit 34, 35.

Another winding 37 of the transformer 33 is connected to a third rectifier circuit including a rectifier $G_3$ and the parallel combination of a resistor 38 and a capacitor 39.

The third rectifier circuit also includes the parallel combination of a resistor 40 and a capacitor 41 which forms part of a fourth rectifier circuit. The fourth rectifier circuit includes a rectifier $G_4$, a secondary winding 42 of the transformer 33, and the secondary winding 43 of a transformer 44 whose primary winding is supplied with the voltage across the resistor 9.

It is obvious that the action of the third and fourth rectifier circuits, in cooperation with the circuit 34, 35 and the resistor 9, corresponds to that of the first and second rectifier circuits, except for the frequency of the pulses.

The voltage set up across the resistor 38 is supplied to the control-grid circuit of tube $B_2$ via the network formed by the capacitor 27 and the resistors 23 and 26. The connection from the resistor 38 includes the parallel combination of a rectifier $G_5$ and a resistor 45.

Upon the occurrence of a signalling pulse having a frequency of 3000 cycles per second, the capacitor 27 is charged comparatively slowly via resistor 45, since by this time the rectifier $G_5$ is cut off, and at the end of the pulse said capacitor is discharged across the resistor 38. This ensures that the signalling of 3000 cycles per second is comparatively slow in relation to the signalling of 2500 cycles per second. This slowness is necessary, since otherwise the operating condition of the tube $B_2$ would change in an excessively rapid manner and would thus be liable to bring about undesirable voltage pulses in the speech channel 29.

If during signalling the anode current of $B_2$ increases on the occurrence of a 3000 cycles per second pulse, continued signalling would result in the signalling level in the circuit 29 becoming excessive.

This may be avoided by making the value of resistor 30 such that the anode voltage of the tube $B_2$ is reduced so that the intensity of signalling remains substantially constant.

In the case of a high intensity of signalling, limitation of the anode current of the two tubes is achieved by the presence of the neon-lamps 8 and 36.

While the invention has been described by means of specific examples and in a specific embodiment, we do not wish to be limited thereto, for obvious modifications will occur to those skilled in the art without departing from the spirit and scope of the invention.

What we claim is:

1. A receiver for intelligence signals having frequency values within a predetermined frequency band and for alternating current pulse signals having a predetermined frequency in said band, said receiver comprising an electron discharge device having an output electrode and a control grid and circuits therefor, means to apply said signals to said control grid, said output electrode circuit including a first resistor and a first relay, a tuned circuit coupled to said output electrode circuit and tuned to the frequency of said pulse signals, a first rectifier circuit coupled to said tuned circuit and providing a first rectified voltage, means for applying said rectified voltage to the control grid of said device for varying the operating condition thereof, a first transformer having a secondary winding and a primary winding connected across said resistor, a second rectifier circuit having a rectifier element connected across said secondary winding to derive therefrom a second rectified voltage, means for applying said second rectified voltage to said first rectifier circuit in a sense opposite to that of said first rectified voltage, and means coupled to said tuned circuit for applying to said second rectifier circuit a voltage in phase-opposition to the voltage derived from said resistor at the frequency of said pulse signal, the voltage across the secondary of said transformer having a sense at which an increase in current through said resistor cuts off said second rectifier element.

2. A receiver, as set forth in claim 1, further comprising means responsive to a second alternating current pulse signal having a second frequency in said band and further including an electron discharge tube having a control electrode and an output electrode and circuits therefor, said output electrode circuit including a second relay, a second transformer, and a second resistor, means for applying said pulse signals to said control electrode, means for coupling a speech output circuit to the output electrode circuit of said tube through said second transformer, means for coupling said second resistor to the control grid of said device for applying said signals thereto, a second tuned circuit coupled to the output electrode circuit of said device and tuned to said second frequency, a third rectifier circuit coupled to said second tuned circuit and providing a third rectified voltage, circuit means for applying said third rectified voltage to the control electrode of said tube for varying the operating condition thereof, a fourth rectifier circuit connected across the secondary winding of said first transformer to derive therefrom a fourth rectified voltage, means for applying said fourth rectified voltage to said third rectifier circuit with a polarity opposed to that of said third rectified voltage, and means coupled to said second tuned circuit for applying to said fourth rectifier circuit a voltage in phase opposition to the voltage derived from said first resistor at the frequency of said second pulse signal.

3. A receiver, as set forth in claim 2, wherein the control electrode circuit of said tube includes a third resistor and a capacitor connected in parallel with said third resistor and wherein said circuit means includes a fourth resistor and an additional rectifier connected in parallel with said fourth resistor, whereby said additional rectifier is cut off when said capacitor is being charged.

References Cited in the file of this patent

UNITED STATES PATENTS

| | | |
|---|---|---|
| 2,577,755 | Hargreaves et al. | Dec. 11, 1951 |
| 2,654,002 | Hooijkamp | Sept. 29, 1953 |